Patented Feb. 10, 1942

2,272,266

UNITED STATES PATENT OFFICE 2,272,266

MANUFACTURE OF POLYCYCLIC HYDROCARBONS

Aristid V. Grosse, Bronxville, N. Y., and William J. Mattox, Chicago, Ill., assignors to Universal Oil Products Company, Chicago, Ill., a corporation of Delaware No Drawing. Application March 30, 1940, Serial No. 326,958

16 Claims. (Cl. 260—668)

This application is a continuation-in-part of our co-pending application Serial No. 230,254, filed September 16, 1938.

This invention relates particularly to the manufacture of naphthalene and phenanthrene although the process disclosed may also be adapted to the manufacture of other poly-cyclic hydrocarbons and their alkylated or arylated derivatives.

It is more specifically concerned with the application of certain definite types of catalysts having a dehydrogenating action on hydrocarbons to the conversion of certain alkylated derivatives of benzene, the reactions involving cyclization after a preliminary dehydrogenation of alkyl substituent groups.

Naphthalene has the formula $C_{10}H_8$, a melting point of 80° C., a boiling point of 218° C., and is commonly obtained in limited amounts by crystallization from coal tar fractions. Its uses are many and various as a base for dye manufacture, picric acid, various phthalic acids, and the hydrogenated compounds tetralin, and decalin corresponding to partial and complete hydrogenation. Similarly there is a large demand for such compounds as anthracene and phenanthrene as intermediate bases for the manufacture of various dyes, explosives, pharmaceutical products, and miscellaneous chemicals. The present process involves a method whereby the available quantities of these materials may be greatly increased and hence constitutes a definite contribution to the art of hydrocarbon synthesis.

In one specific embodiment the present invention comprises the manufacture of poly-cyclic hydrocarbons comprising naphthalene and phenanthrene by subjecting the vapors of mono- and di-n-butyl-benzenes to contact with dehydrogenating catalysts at elevated temperatures.

We have determined that when using suitable catalysts and conditions of operation commercially practical yields of naphthalene and phenanthrene are obtainable by the dehydrogenation of butyl substituent groups which dehydrogenation is followed by cycling reactions with bonding of the end carbon atom in the butyl chain in the 2-position on the ring. The following structural equations are given to indicate the reactions which occur although no suggestions are given as to the intermediate stages.

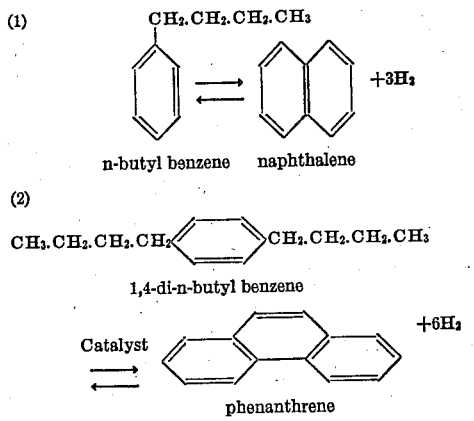

The preferred catalysts for accelerating the reactions in the directions indicated consist in general of relatively inert and refractory supports containing compounds and preferably oxides of the elements in the left-hand column of group 5 of the periodic table. These elements comprise vanadium, columbium and tantalum.

As a rule, effective catalysts are obtainable by adding minor amounts of the promoting compounds to carriers, although in some cases this rule need not be strictly adhered to. The carriers which may be employed comprise a large number of supports which may be of a siliceous character and structurally stable under conditions of service and reactivation. Suitable materials are aluminum oxide and the oxides of the alkaline earth metals, particularly magnesium oxide when these catalysts are prepared under proper conditions. Siliceous carriers comprising fuller's earth, various clays, montmorillonite or bentonite, either raw or acid treated, various forms of silica and natural or artificial silicates may also be used. To these materials either in powdered or granular form are added various compounds of the preferred catalytic elements either by impregnating the granular support with a solution of a salt of a volatile acid and then dehydrating and calcining to leave an oxide residue, or hydroxides may be precipitated onto the granules by suspending them in solutions of salts and adding alkaline precipitants after which the suspended material consisting of refractory supports and adhering hydroxide is again dehydrated and calcined to leave a residue of catalytic oxide on the surface and in the pores of the support. The manufacture of catalysts for use in the invention is not limited to the use of any particular method of adding the catalytic compounds to supports, and any method suited to the reactions of the particular element chosen may be employed. If desired a powdered and refractory support may be impregnated with a suitable compound and the composite formed into particles by extrusion or pelleting methods before or after calcination.

Not all of the compounds, particularly the oxides of the preferred catalytic elements, have the same or exactly equivalent catalytic value in accelerating the reactions involved in the invention, and when different oxides are used on different supports, optimum conditions for the formation of maximum yields of the desired compounds will vary. One particularly good combination of a support and catalyst consists of carefully calcined or activated alumina, supporting an oxide of vanadium in amounts of from approximately 4–20% by weight of the catalyst. A satisfactory alumina-vanadia catalyst may be produced by first adding a compound of vanadium such as ammonium-vanadate or vanadium nitrate to preactivated alumina granules or pellets in the requisite amounts, calcining to leave a residue of vanadium oxide. The catalyst may then be treated with hydrogen for a short time at a moderately elevated temperature. It is also within the scope of the invention to use more than one oxide on a support.

The actual operation of the process is relatively simple and consists in vaporizing the n-butyl derivatives and passing them through beds of selected dehydrogenating catalysts contained in vertical cylindrical treating chambers or in relatively small diameter tubes in multiple connection between distributing headers, this last arrangement being the most suitable one on account of the endothermic character of the reactions which require constant addition of heat and maintenance of exact temperatures for best results. The products may be separated by physical fractionation or chemical methods as may be found most expedient in any case. Unconverted material may be recycled to improve yields. N-butyl benzene boils at 180° C. and the p-di-n-butyl benzene boils at 260° C. and no difficulty is experienced in vaporizing them without decomposition.

The temperatures most favorable to the desired reactions are comprised within the approximate range of 450–650° C. and atmospheric pressures are suitable, although sub-atmospheric or moderately superatmospheric are utilizable. Contact times will be varied with the type and activity of the particular catalyst chosen from the group specified and may be comprised within a rather wide range of the order of 0.1–60 seconds.

The following examples are introduced to further illustrate the character of the invention, although not for the purpose of unduly limiting its proper scope.

*Example 1.*—The vapors of n-butyl benzene may be preheated to a temperature of 500° C. under atmospheric pressure and passed over a catalyst consisting of alumina supporting 4% by weight of vanadium oxide at a contact time of 8 seconds to produce approximately 53% of naphthalene.

*Example 2.*—When 1,4-di-n-butyl benzene is vaporized and passed over the same type of catalyst used in Example 1 at a temperature of 500° C. under substantially atmospheric pressure at a contact time of approximately 10 seconds, a yield of approximately 15% of phenanthrene may be obtained.

We claim as our invention:

1. A process for producing poly-cyclic hydrocarbons from n-butyl benzenes which comprises subjecting a n-butyl benzene to dehydrogenating and cyclizing conditions of temperature and time in the presence of a catalyst comprising a relatively inert support having deposited thereon a compound of a heavy metal selected from the elements appearing in the left-hand column of the fifth group of the periodic table.

2. A process for producing poly-cyclic hydrocarbons from n-butyl benzenes which comprises subjecting a n-butyl benzene to dehydrogenating and cyclizing conditions of temperature and time in the presence of a catalytic agent consisting of a relatively inert support having deposited thereon an oxide of an element selected from the left-hand column of the fifth group of the periodic table.

3. A process for producing poly-cyclic hydrocarbons from n-butyl benzene which comprises subjecting a n-butyl benzene at a temperature within the approximate range of 450–650° C. and a contact time of from 0.1–60 seconds to the action of a catalyst comprising a relatively inert support having deposited thereon an oxide of an element selected from the left-hand column of the fifth group of the periodic table.

4. A process for producing poly-cyclic hydrocarbons from n-butyl benzenes which comprises subjecting a n-butyl benzene to dehydrogenating and cyclizing conditions of temperature and time in the presence of alumina having deposited thereon an oxide of an element selected from the left-hand column of the fifth group of the periodic table.

5. A process for producing poly-cyclic hydrocarbons from n-butyl benzenes which comprises treating a n-butyl benzene at a temperature within the range of approximately 450–650° C. and a contact time of from 0.1–60 seconds with a catalyst comprising alumina having deposited thereon an oxide of an element selected from the left-hand column of the fifth group of the periodic table.

6. A process for producing poly-cyclic hydrocarbons from n-butyl benzene which comprises treating a n-butyl benzene at a temperature of approximately 450–650° C. and a contact time of from 0.1–60 seconds with a catalyst comprising a major portion of alumina having deposited thereon a relatively minor portion of an oxide of vanadium.

7. A process for producing poly-cyclic hydrocarbons from n-butyl benzenes which comprises treating n-butyl benzene under dehydrogenating and cyclizing conditions of temperature and time with an oxide of an element selected from the members of the left-hand column of the fifth group of the periodic table.

8. A process for producing poly-cyclic hydrocarbons from n-butyl benzenes which comprises treating a n-butyl benzene under dehydrogenating and cyclizing conditions of temperature and time with a catalyst consisting essentially of an oxide of vanadium.

9. A process for producing naphthalene which comprises subjecting mono-n-butyl benzene at a temperature within the approximate range of 450-650° C. and at a contact time of 0.1-60 seconds to the action of alumina supporting an oxide of vanadium.

10. A process for producing phenanthrene which comprises subjecting di-n-butyl benzene to dehydrogenating and cyclizing conditions of temperature and time in the presence of an oxide of an element selected from the left-hand column of the fifth group of the periodic table.

11. A process for producing phenanthrene which comprises treating di-n-butyl benzene at a temperature of approximately 450-650° C. and at a contact time of 0.1-60 seconds with a catalyst comprising essentially an oxide of an element appearing in the left-hand column of the fifth group of the periodic table.

12. A process for producing phenanthrene which comprises treating 1,4-di-n-butyl benzene at a temperature of approximately 450-650° C. and for a contact time of approximately 0.1-60 seconds with an oxide of an element appearing in the left-hand column of the fifth group of the periodic table.

13. A process for producing phenanthrene which comprises treating di-n-butyl benzene at a temperature within the range of approximately 450-650° C. and for a contact time of 0.1-60 seconds with a catalyst comprising alumina having deposited thereon an oxide of an element appearing in the left-hand column of the fifth group of the periodic table.

14. A process for producing phenanthrene which comprises treating 1,4-di-n-butyl benzene at a temperature within the range of approximately 450-650° C. for a contact time of 0.1-60 seconds with a catalyst composite comprising a major portion of activated alumina having supported thereon a relatively minor portion of an oxide of vanadium.

15. A process for producing naphthalene which comprises treating mono-n-butyl benzene at a temperature within the range of approximately 450-650° C. for a contact time of approximately 0.1-60 seconds with a composite comprising a major portion of alumina having supported thereon a relatively minor portion of an oxide of vanadium.

16. A process for producing naphthalene which comprises treating mono-n-butyl benzene at a temperature within the range of approximately 450-650° C. for a contact time of approximately 0.1-60 seconds with a composite comprising a major portion of a relatively inert support having deposited thereon a relatively minor portion of an oxide of an element appearing in the left-hand column of the fifth group of the periodic table.

ARISTID V. GROSSE.
WILLIAM J. MATTOX.